Nov. 29, 1966  W. E. HARDING  3,288,045
METHOD AND APPARATUS FOR PRODUCING ARTICLES HAVING
ARRAYS OF SIMILAR PATTERNS
Original Filed Dec. 22, 1961  7 Sheets-Sheet 1

INVENTOR
WILLIAM E. HARDING
BY D. Kendall Cooper
ATTORNEY

Nov. 29, 1966 W. E. HARDING 3,288,045
METHOD AND APPARATUS FOR PRODUCING ARTICLES HAVING
ARRAYS OF SIMILAR PATTERNS
Original Filed Dec. 22, 1961 7 Sheets-Sheet 2

Nov. 29, 1966    W. E. HARDING    3,288,045
METHOD AND APPARATUS FOR PRODUCING ARTICLES HAVING
ARRAYS OF SIMILAR PATTERNS
Original Filed Dec. 22, 1961    7 Sheets-Sheet 3
FIG. 3a
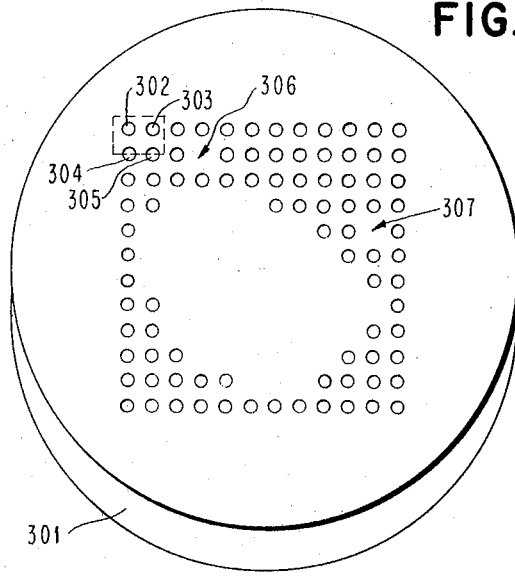
FIG. 3b
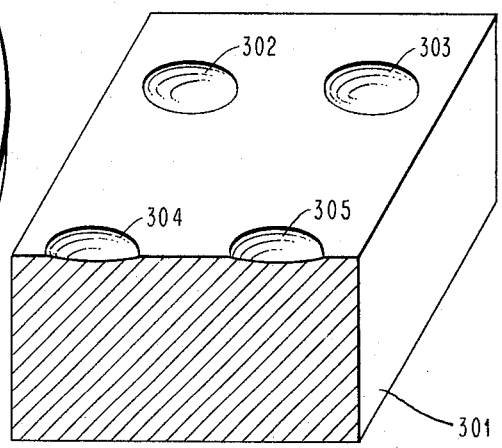
FIG. 4a
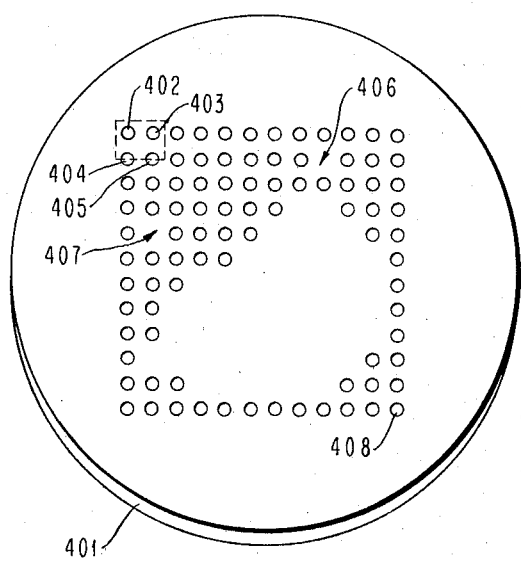
FIG. 3c
FIG. 4b
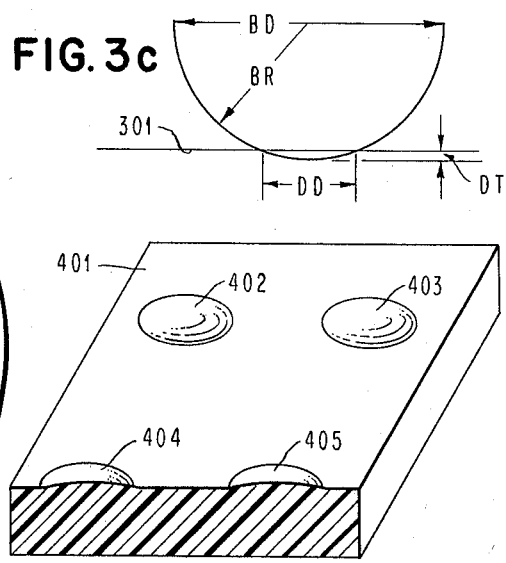

Nov. 29, 1966                W. E. HARDING                3,288,045
           METHOD AND APPARATUS FOR PRODUCING ARTICLES HAVING
                        ARRAYS OF SIMILAR PATTERNS
Original Filed Dec. 22, 1961                        7 Sheets-Sheet 5
FIG. 6
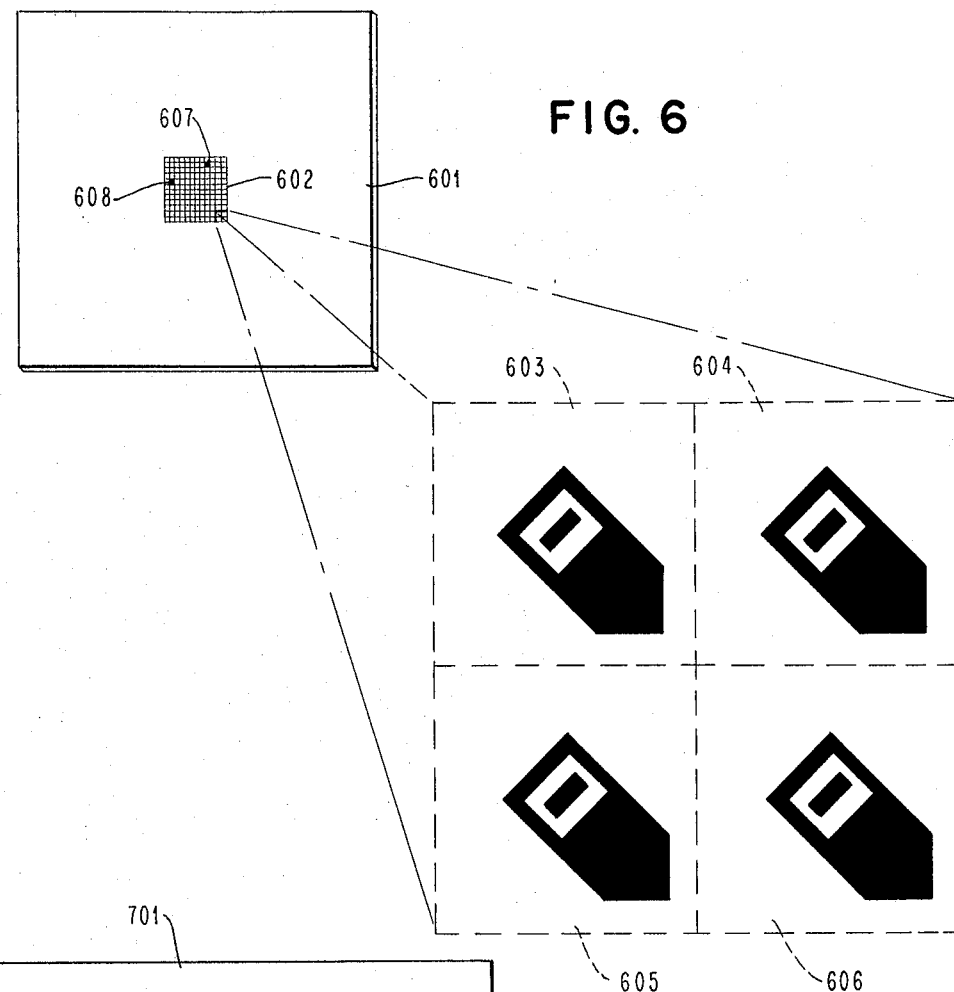
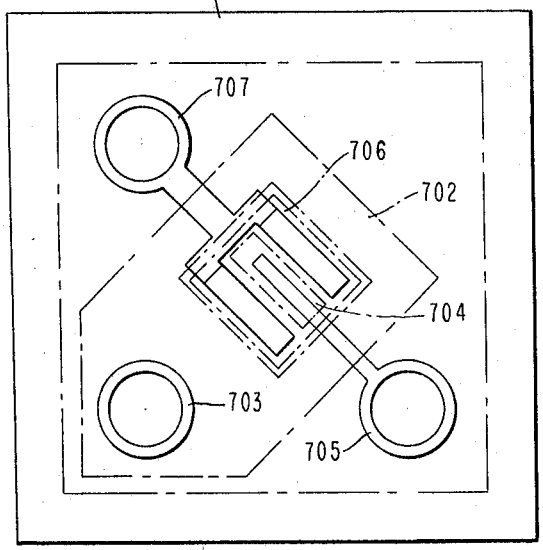
FIG. 7

Nov. 29, 1966   W. E. HARDING   3,288,045
METHOD AND APPARATUS FOR PRODUCING ARTICLES HAVING
ARRAYS OF SIMILAR PATTERNS
Original Filed Dec. 22, 1961   7 Sheets-Sheet 6

Nov. 29, 1966  W. E. HARDING  3,288,045
METHOD AND APPARATUS FOR PRODUCING ARTICLES HAVING
ARRAYS OF SIMILAR PATTERNS
Original Filed Dec. 22, 1961  7 Sheets-Sheet 7

3,288,045
METHOD AND APPARATUS FOR PRODUCING ARTICLES HAVING ARRAYS OF SIMILAR PATTERNS
William E. Harding, Poughkeepsie, N.Y., assignor to International Business Machines Corporation, New York, N.Y., a corporation of New York
Continuation of application Ser. No. 161,625, Dec. 22, 1961. This application May 4, 1965, Ser. No. 467,159
13 Claims. (Cl. 95—18)

This is a continuation of application Serial No. 161,625, filed December 22, 1961.

This invention relates to production of patterned articles, and more particularly to techniques and apparatus for producing articles having arrays of similar patterns in a more rapid manner and with increased accuracy.

The invention will be discussed herein in connection with the production of photographic masks and metal masks, and the fabrication of miniature circuit elements, such as semiconductor devices. It will be apparent, however, that a wide variety of other applications for the invention are possible, such as the fabrication of punch and die sets, aperture plates, silk screen patterns, and other articles that require accurate registration of patterns.

The electronics and computer industries are presently engaged in miniaturization programs for reducing solid-state components to microscopic size. Efforts are being made to manufacture a large number of semiconductor devices from a single small wafer of semiconductor material. For example, in one case, several hundred, or as many as a thousand, transitors having substantially identical dimensional and electrical characteristics, are formed from a single semiconductor starting wafer which is one-half inch to one inch square and which has a thickness of about 10 mils. Very small cutaway portions or apertures having 2 x 4 mil dimensions, or less, and junction spacings of about 0.1 mil at the surface of a semiconductor are planned for some applications.

In one manufacturing process, silicon dioxide is grown or evaporated to form a thin impervious adherent film on predetermined surface areas of a semiconductor wafer. A geometric pattern of apertures is established in the film by etching to expose predetermined areas of the surface of the wafer. The exposed areas or regions are then subjected to the influence of vapors or other sources of active impurities which modify the conductivity of the exposed regions, or they may be conditioned to receive evaporated metal contacts which serve as terminals. PN junctions and terminals for the regions of different conductivities are thus formed in predetermined areas of a semiconductor device by the use of apertured films.

The photo engraving technique is one of several that have been used in the manufacture of semiconductor devices for establishing film apertures in desired locations. In this technique, after the wafer has been covered with the continuous coherent film, such as silicon dioxide, the wafer is then coated with a photosensitive material to form a resist. The latter is then exposed to light through a photographic mask or stencil that has patterns of dark and light areas in predetermined locations. The portions of the resist that were exposed to the light are insoluble in a developing fluid and remain on the silicon dioxide film while the portions of the resist that were protected from the light by the opaque areas in the stencil are dissolved by the fluid, thus leaving a plurality of apertures in the resist. These apertures in turn expose small areas of the silicon dioxide film. Thereafter a corrosive fluid of a solution such as hydrofluoric acid is applied to the photoresist and to the exposed areas of the silicon dioxide to etch a pattern of tiny apertures in the silicon dioxide film. Subsequently, impurity materials are diffused through these apertures in the silicon dioxide mask into the semiconductor wafer to create, for example, a pattern of PN junctions.

In order to develop a desired geometric configuration for all semiconductor units, the wafer normally undergoes a sequence of operations that includes a repetition of the steps just described at intervals during the sequence. At such times, the wafer is again coated with photosensitive resist, which is again exposed and developed in the manner just described. Normally, a series of masks is provided, and a different mask is used at each exposure step in order to develop a desired geometric design of exposed and unexposed areas on the surface of the wafer for subsequent etching, diffusion, or deposition.

During a typical process, the first mask used may prepare the wafer for base diffusion, which is then performed. The second mask may prepare the wafer for emitter diffusion, which is subsequently accomplished. Other masks in the series may condition the wafer for subtraction of metal, additional base diffusion, or other operations.

In some cases, metal masks having apertures in predetermined locations are also used during the fabrication process in conjunction with the photographic masks for direct control of evaporation or deposition.

It is necessary to maintain high standards of accuracy during the production of miniature circuit elements and the masks employed should therefore have an arrangement of patterns, such as squares, circles or other designs, that are accurately positioned in a matrix or array that corresponds to the array of semiconductor elements that it is desired to produce.

In order to insure that individual semiconductor units with high quality and stable characteristics are produced, it is essential that the corresponding design elements be accurately registered on the respective masks of a series.

It is necessary that each semiconductor design or pattern area produced by etching or deposition following exposure through a particular mask be registered as perfectly as possible with those areas that are produced after exposure to other masks used earlier or later in the process.

Heretofore, such registration has been difficult to attain due to the microscopic dimensions of several ten-thousandths of an inch, or less, that are being worked with. Until the present time, the preparation of the various masks required has been a laborious and time-consuming operation. Even then, accurate registration of the masks has not always been satisfactory.

One prior technique that has been used for making photographic masks, is termed the "step and repeat" method. In this method, a master pattern or object of the desired design is first produced, perhaps 50 times (50×) the actual size of the final semiconductor element. This pattern is then reduced through conventional photographic reduction techniques to a smaller pattern of perhaps 20 times (20×) actual size.

The "step and repeat" part of the operation then takes place. During this phase, a photographic plate or negative is placed in a microgauge device and the 20× pattern is projected thereon only in a first selected area. The pattern is then stepped a specified distance, and is again projected onto the plate. In this way, a row of latent images is formed in the plate. The plate is developed, and is then used to form a series of rows in a second plate by a similar step and repeat operation. An entire matrix or array of images is formed in this manner. When the latent image of the last row has been formed, the plate is developed, and a final plate is derived therefrom with a concurrent reduction to actual size of the final product.

As a practical matter, it has proven to be difficult, if not impossible, with the step and repeat method, to establish the images on one mask in the same relative positions as their related images on another mask of a series, with a satisfactory degree of accuracy. Because of this, the individual members of a matrix of small circles on one mask, for example, in all likelihood, will not register concentrically with correspondingly situated members of a matrix of large circles on another mask. Many of the semiconductor devices are imperfectly formed when masks that do not register are used during their manufacture and are therefore unusable.

Accordingly, an object of the invention is to provide a method for simultaneously establishing in a photosensitive medium a plurality of images having a common configuration.

An additional object of the invention is to provide a method for producing a mask with a plurality of images that are accurate representations of a master pattern.

A further object of the invention is to provide a method for rapidly producing a mask having a plurality of microscopic images from a master pattern by using a drastically reduced number of steps.

Another object of the invention is to provide a method for producing with speed and accuracy interrelated masks for use in the fabrication of circuit elements.

Another object of the invention is to provide a method for producing a series of masks, each being accurately registrable with all other masks in the series.

A further object of the invention is to provide a method for producing a series of masks that have groups of interrelated geometric patterns that are accurately registrable one with another.

Another object of the invention is to provide a method for producing a series of masks having related groups of patterns, with all patterns on any mask being accurately registrable with respect to their related patterns on any other mask.

An additional object of the invention is to provide a method for producing a series of masks with accurately registrable interrelated geometric patterns that insure accurate fabrication of circuit elements having constituent members with geometric configurations that correspond to the geometric patterns on the respective masks.

A still further object of the invention is to provide apparatus for high-speed and simplified production of a series of related masks each having a plurality of images, which insures accurate registration of corresponding images among the various masks.

Another object of the invention is the provision of apparatus which is directly usable during the manufacture of circuit elements and which establishes their configuration.

Also among the objects of the invention is the provision of apparatus in which a plurality of images are derived from a master pattern for direct application to properly treated circuit elements at selected times during their production in order to establish their final configuration.

An additional object of the invention is the provision of apparatus for direct use at selected intervals during the formation process of a circuit element having a number of constituent members, which apparatus insures accurate arrangement and registration of each member with respect to all other members regardless of the time of formation of the respective members during the process.

Another object of the invention is to provide apparatus for producing a series of metal masks or a series of photographic masks or a series of each type intermixed, with accurate registration being maintained among the various masks of a series regardless of the type of mask.

Another object of the invention is the provision of apparatus for producing an accurately registrable series of masks that are useful in the manufacture of semiconductor devices.

In addition, an object of the invention is to provide apparatus which is directly usable in the manufacture of semiconductor devices.

In order to accomplish these and other objects of the invention, apparatus and techniques have been provided for producing masks having a plurality of images, wherein the images are simultaneously established from a master pattern.

In another aspect of the invention, apparatus and techniques have been provided for directly controlling the configurations of a plurality of circuit elements by simultaneous establishment of a plurality of related images from a master pattern at selected steps in the process of manufacture of the circuit elements.

The foregoing and other objects, features and advantages of the invention will be apparent from the following more particular description of the preferred embodiments of the invention as illustrated in the accompanying drawings.

In the drawings:

FIGURES 3a, 3b and 3c represent a device that is useful in producing components for use in the apparatus of FIGURE 1.

FIGURES 4a and 4b represent a component that is used in the apparatus of FIGURE 1.

FIGURE 6 represents a mask that is produced under control of the apparatus of FIGURE 1.

FIGURE 7 represents a typical circuit element produced during the practice of the invention.

*Description and operation of apparatus*

Figure 1:
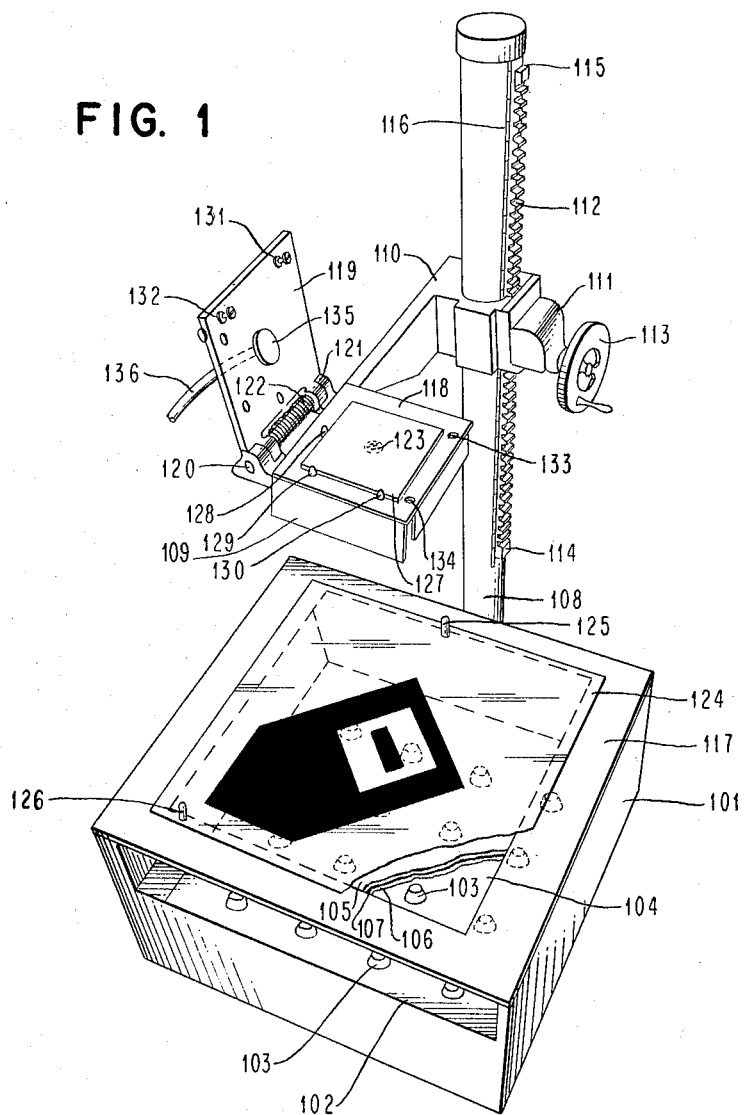
FIGURE 1 represents apparatus that is useful in practicing the invention.

The apparatus of FIGURE 1 is generally based on optical and photographic principles. It includes a base assembly 101 with a light box portion 102. The light box 102 houses a number of light sources 103 that are arranged in a 4 x 4 matrix within the light box 102 for uniform light distribution.

Above the light box 102 and integrally formed in the base assembly 101, is a square flanged opening 104. The flanged opening 104 accommodates two pieces of plate glass 105 and 106 which have a piece of translucent paper 107 sandwiched therebetween for light diffusion purposes. The pieces of glass 105 and 106 and paper 107 are shown slightly cut away for clarity.

Attached to the base 101 in a vertical position is a cylindrical column 108. The column 108 supports a platform 109 by an extension arm assembly 110. The platform 109 is centrally positioned above the light box 102. The arm assembly 110 houses gear elements in a housing 111 which cooperate with a gear rack 112 on the column 108. The gearing arrangement is manually controlled by a crank wheel 113, and permits positioning of the arm assembly 110 and the attached platform 109 from a lower extremity 114 to an upper extremity 115 on the column 108.

A linear scale 116 is attached to the column 108, and is graduated in inches, for example, from 5 inches at the lower extremity to 33 inches at the upper extremity to enable the user to establish a desired object distance.

The platform 109 supports a cover assembly 119 by means of hinges 120 and 121. The cover assembly 119 moves from an open position, as shown, to a horizontal closed position. The cover assembly 119 is held in its open position by means of a helical spring 122.

The platform 109 accommodates a multiple lens array 123, whose upper surface is flush with the upper surface 118 of the platform 109. The lens assembly is shown in greater detail in FIGURES 4a and 4b.

In practice, the apparatus of FIGURE 1 is placed in a photographic dark room. A master pattern or object 124 is placed on the surface 117 of the base assembly 101 in a predetermined position, with alignment of the pattern 124 being performed by means of openings in the pattern 124 which receive alignment pins 125 and 126. A piece of film, or glass plate with photographic emulsion on the underneath side, or a properly treated circuit element or substrate such as a silicon wafer that is coated with photoresist on the underneath side, is then placed in position for exposure in contact with the multiple lens array 123 and flush with the upper surface 118 of the platform 109. Such an element is designated 127 in FIGURE 1. If desired, alignment pins 128, 129 and 130 can be provided on the surface 118 for alignment of the element 127 prior to exposure. Other alignment methods, especially with respect to circuit elements of microscopic size, will be discussed later in conjunction with FIGURES 9, 10a, and 10b.

When the plate or element 127 has been properly positioned, the hinged cover 119 is lowered so that bolts 131 and 132 engage openings 133 and 134. This latches the cover 119 into its proper position for the exposure operation. The cover 119 contains a centrally located diaphragm 135 which can be inflated through a hose 136 from an air supply, not shown. This exerts a desired pressure on the plate or element 127 to insure proper contact with the lens array 123 during exposure.

If it is desired to expose a photographic plate, the light sources 103 would likely be incandescent lamps. If it is desired to expose a circuit element coated with photoresist, the sources would ordinarily provide ultraviolet rays.

Figure 2A:
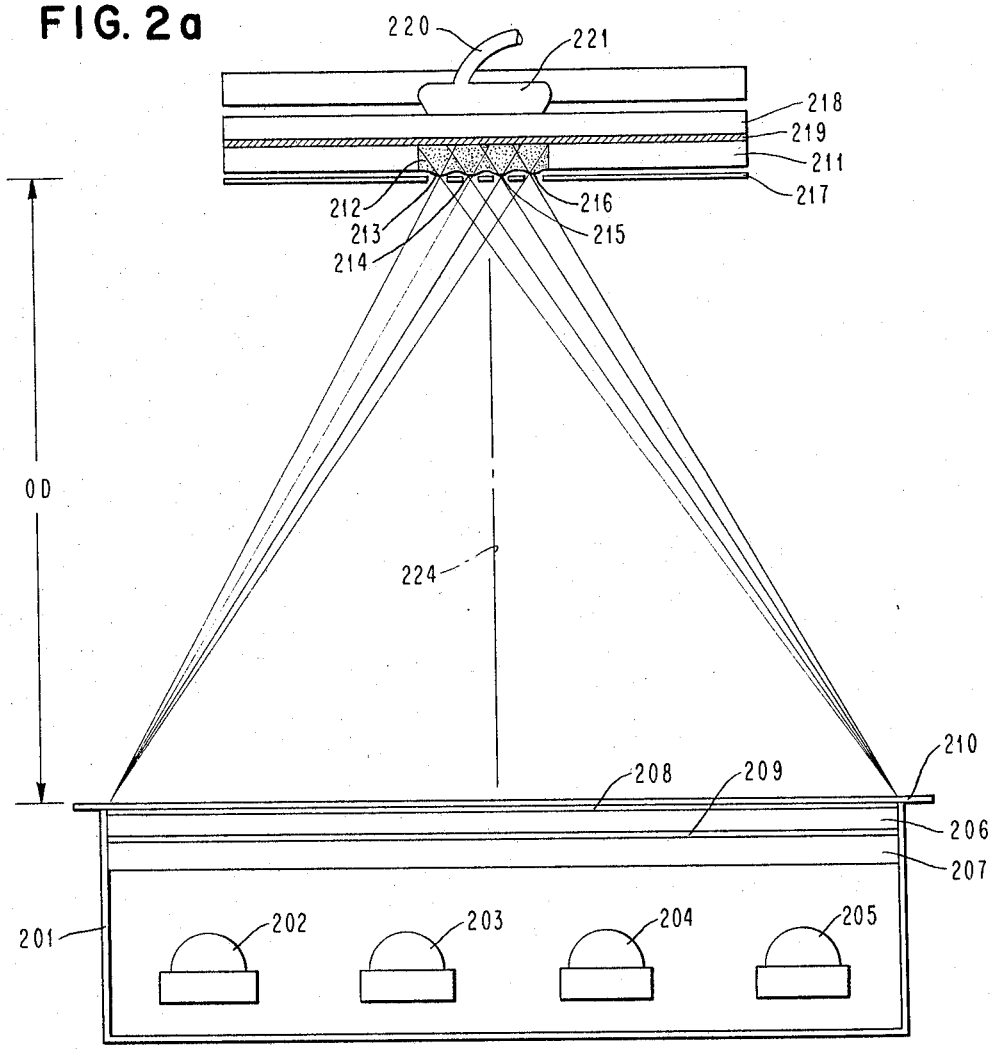
FIGURES 2a and 2b are schematic representations of the apparatus of FIGURE 1.
Figure 2B:
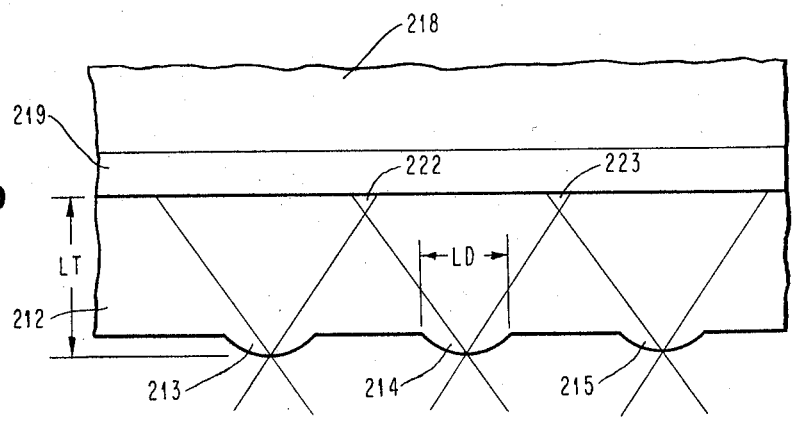

Additional insight regarding the relationship of significant elements of FIGURE 1 will be gained by reference to FIGURES 2a and 2b. FIGURE 2a is a schematic representation of the apparatus and elements of FIGURE 1, and shows a light box 201, like that in FIGURE 1, which houses lamps 202–205. The light box 201 is provided with plate glass elements 206 and 207 and two translucent sheets of paper 208 and 209 for diffusion purposes, rather than one sheet, as in FIGURE 1.

A master pattern or object 210 is shown positioned for projection on the upper surface of the light box 201.

A platform 211, which corresponds to the platform 109 in FIGURE 1, is centrally positioned above the master pattern 210. The platform 211 contains a lens array 212 which, for reasons of simplicity, is indicated in FIGURE 2 as having four lens elements 213–216. In actual practice, the lens array 212 would usually have hundreds, perhaps thousands of lenses, like the lenses 213–216.

Positioned beneath the platform 211 is an aperture plate 217. As can be seen in FIGURE 2, the aperture plate 217 has a number of openings therein which correspond in number to the number of lenses 213–216. The plate 217 is clamped in position adjacent the lens array 212 so that each opening in the plate serves to stop down an associated lens in the lens array 212. A satisfactory resolution over the useful field of each lens, and uniform exposure over the entire array is thereby established.

The object distance OD, that is indicated to the left in FIGURE 2, is the distance from each lens to the master pattern 210 and is the same for all lenses, since, in this case, each lens lies in a plane that is parallel with the plane of the master pattern 210. The object distance OD is established by moving the platform 211 up or down with respect to the pattern 210 by the gear means previously described. An element 218, such as a high resolution photographic plate, is placed in position with its emulsion layer 219 in contact with the lens array 212.

Air is then supplied through a hose 220 to an inflatable diaphragm 221 from a source, not shown, so that the diaphragm 221 retains the element 218 firmly positioned against the lens array 212. It will be understood that the element 218 may also represent a circuit substrate that has been coated with a photoresist 219.

The element 218 then underoges exposure for an interval of time, such as 15 to 20 seconds. Due to the novel structural and operational characteristics of the apparatus described, a plurality of latent images are thereby established in the photosensitive or photoresistive layer 219. Each image is a substantially exact replica of the master pattern 210. The images are subsequently fixed or developed to establish an array of patterns by masures determined by the type of photosensitive medium exposed.

While the principles disclosed herein can be used to good advantage in a variety of manufacturing processes, the invention finds exceptional utility in the manufacture of miniature or microscopic circuit elements. The dimensional relationships that were found to be effective for production of such elements are presented directly below. It will be understood that various dimensional relationships can be established by the user, according to his particular requirements.

If it is desired, for example, to establish microscopic images or unit cells, each 30 mils square, the following dimensional relationships have proven to be satisfactory:

| | |
|---|---|
| Size of master pattern or object _____in. sq. max__ | 18 |
| Thickness of lens array LT _____mils__ | 71 |
| Center to center spacing of lenses _____do____ | 30 |
| Lens diameter LD _____do____ | 15 |
| Aperture diameter _____do____ | 12 |
| Thickness of aperture plate _____do____ | 1 |
| Radius of lens _____do____ | 23 |
| Object distance OD _____in__ | 24 |
| Light box, lamp size, each _____watts__ | 100 |

With the dimensions noted, a multitude of microscopic images of the size indicated, are photographically established in the plane of the photosensitive layer 219. Each image, in this case, will be 1/500 of the size of the master pattern 210. Some overlap of adjacent images is purposely provided to insure complete coverage of the area being exposed. This overlap is shown at 222 and 223, FIGURE 2b.

Lens and aperture formation

In order for satisfactory results to be obtained during the production of microscopic elements, it is important that high standards of accuracy and control be maintained during the various steps involved in the operation, as well as in the components that are used in the apparatus of FIGURES 1 and 2, or other apparatus.

The lens array, as one example, must be accurately dimensioned. The production of the lens array will be described by reference to FIGURES 3a, 3b and 3c, as well as FIGURES 4a and 4b. A first step in the production of the lens array is the preparation of a mold such as the mold 301, FIGURE 3, which may be of a number of materials including aluminum, copper, or stainless steel. Materials other than those mentioned may prove entirely satisfactory.

In one case, a nest of chrome alloy balls is arranged in a desired array by first machining a box-like container into which the balls are placed. Depressions, such as depressions 302–305 are formed in the mold 301 by pressing the array of balls against the mold 301. The depressions 302–305 are shown somewhat enlarged in FIGURE 3b. An enlarged diagram of the action involved is shown in FIGURE 3c.

In order to mold lenses having dimensions like those tabulated above, a ball diameter BD of 46 mils, that is, a radius BR of 23 mils, is depressed a controlled amount into the mold 301 at each point where an individual lens mold is desired. With this ball size, a depression diameter DD of 15 mils and a depression depth DT of about one mil are formed in the mold 301.

In another method for producing a mold, the mold block is secured on an "X–Y" micrometer stage. A single ball is placed in a retainer that is associated with a manually operable punch mechanism. In this arrangement, the block is positioned in a desired location and a first depression to a desired depth is made by bringing the ball down against the mold 301. By making appropriate micrometer adjustments, the mold 301 is then moved to the next cell location, and the punch mechanism is actuated again in order to form another depression. The various depressions in the mold 301 can be accurately placed in this manner in arbitrary locations that are not dependent on the ball diameter. In particular, they may be placed closer together than in the first method.

When all depressions have been formed in the mold, it is placed at one end of a closed cylinder. A disk such as disk 401 in FIGURE 4a, is then placed adjacent the side of the mold that has the previously formed depressions. A glass piston is then placed against the other side of the disk. The disk 401 may be of plastic, or other transparent material. The entire assembly is then placed in a molding press with the application of high temperature and pressure for a desired period of time. The thickness of the lens disk 401 depends on the weight of the disk which is determined before the molding process.

As a result of the foregoing operations, a lens array having a multitude of lenses that correspond in number to the depressions in the mold 301 will be formed as at 402–405. The lenses 402–405 are shown greatly enlarged in FIGURE 4b. Each lens will have a diameter of 15 mils which corresponds to the diameter of the depression in the mold, and each lens will project about one mil from the surface of the lens disk 401. The second method that was just described for producing a lens array insures accuracy of placement of the lenses to $\frac{1}{10}$ mil.

In order to simplify production of lens arrays, such as the array on disk 401, FIGURE 4a, the lenses produced are of the single element variety or "simple" lens. It will be apparent that lens configurations of various types and complexities can be used to good advantage.

The aperture plate 217 in FIGURE 2 can be made in the same X–Y micrometer device in which the mold is made with the exception that the ball used in making the mold 301 is replaced with a punch and die in order to punch the openings in the plate. By appropriate manipulation of the X–Y micrometer positioning controls, each aperture plate opening will register with a lens in the finished lens disk 401.

There are a number of factors which affect the actual final dimension of each image produced with the lens array discussed. For example, shrinkage of the lens disk 401 may result in the production of unit cells that are not exactly 30 mils square. Another factor involved is that because each lens is in a plane that is parallel with the master image, they do not have a common optical axis. Referring to FIGURE 2, if the vertical line 224 is considered to be the center of the master image 210, it can readily be seen that the lenses 213 and 214 are displaced to the left of this axis, while the lenses 215 and 216 are displaced to the right of this axis. The center of each unit cell is displaced from the optical axis of its lens by an amount that is proportional to the distance of the optical axis from the center line 224. In one case, it was found that the two factors of lens shrinkage and image displacement exactly compensated for one another. As a practical matter, however, and as one of the important aspects of the present invention, the relative positioning of the respective lenses or individual structural or distortion peculiarities are generally of no great consequence with respect to the final product.

*Master patterns*

Figure 5:
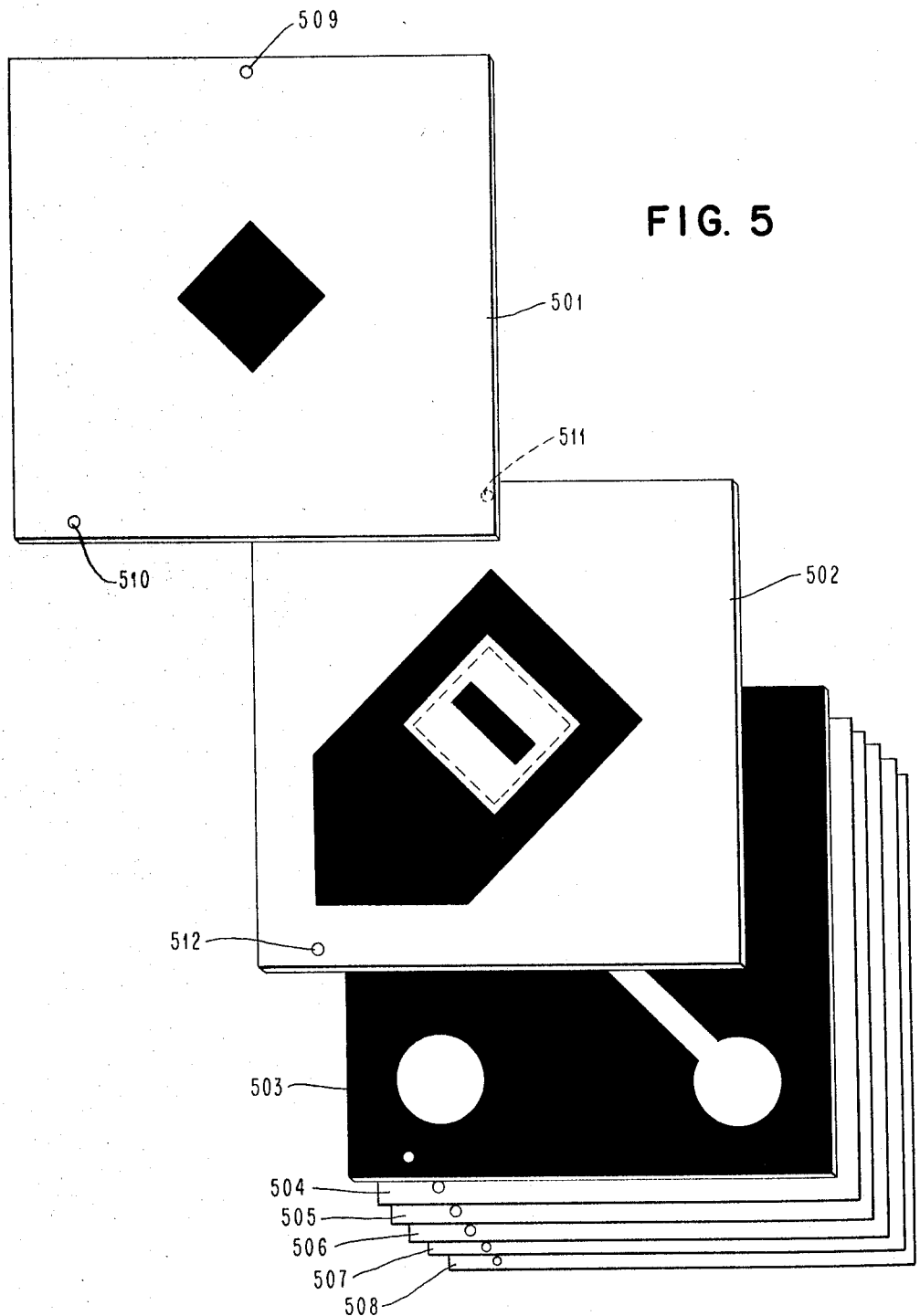
FIGURE 5 depicts a typical series of master patterns that are useful in practicing the invention.

A typical series of transparent master patterns 501–508 that are used for production of a semiconductor device are shown in FIGURE 5. These patterns include both the type generally designated as "black on clear," such as pattern 501, and the type generally designated "clear on black," such as pattern 503. Each pattern has a pair of alignment holes, such as 509 and 510 on the pattern 501, and 511 and 512 on the pattern 502.

*Production of masks*

If a series of photographic masks for producing miniature semiconductor devices is desired, each of the master patterns in a series, such as the typical series in FIGURE 5, is positioned in turn on the alignment pins 125 and 126 in FIGURE 1 for subsequent projection. For each master pattern, a fresh photographic film or plate 127 is then placed in position on the platform 109 in FIGURE 1 adjacent the lens array 123, for subsequent exposure and development as described. As pictured in FIGURE 1, a master pattern corresponding to the pattern 502 in FIGURE 5 has been positioned for projection.

In this manner, a series of photographic masks is produced in a simple and efficient manner, each mask having a multitude of microscopic images or patterns which are essentially exact replicas of the master pattern used during the exposure. This is shown in FIGURE 6 where a photographic mask 601 is indicated as having a matrix of images generally indicated at 602. Four of the images 603–606 that lie at the lower right hand corner of the matrix have been projected forward in order to show their similarity to the master pattern 502 in FIGURE 5 from which it is assumed they were produced. Each square or unit cell 603–606 in the case mentioned, would be 30 mils square.

Normally, each photographic mask, such as mask 601 in FIGURE 6 would be used at a particular step in the manufacture of a semiconductor device. For example, the photographic mask produced from the master pattern 501 would be used to establish resist patterns on a semiconductor wafer for controlling base diffusion. The photographic mask produced from the master pattern 502 would be used for establishing resist patterns on a semiconductor wafer for controlling emitter diffusion. Other masks in the series would control other steps in the fabrication of the semiconductor devices.

The images in the matrix 602, FIGURE 6, are all established simultaneously through the multiple lens array in the apparatus of FIGURE 1, and in accordance with the principles of the invention, a number of outstanding advantages are provided. One advantage that is apparent is that all images in a particular matrix or array will be photographically identical with respect to contrast or other aspects, since the time of exposure is identical for the entire array of images.

It is necessary that the circuit element or semiconductor wafer be accurately positioned and aligned with respect to each mark of a series during the various steps of the process. If the mold 301, FIGURE 3a, has depressions omitted at a number of predetermined locations such as location 306 and location 307, no lenses will appear at corresponding locations 406 and 407 in the finished lens array 401, FIGURE 4a. Therefore, no microscopic pattern will be established in any photographic mask at these locations, which are designated 607 and 608 in FIGURE 6. This permits a simple visual inspection of the finished mask to be made for roughly positioning the mask with respect to the semiconductor wafer or other element in order to insure proper orientation of each of the photographic masks. Final alignment is made more exactly with precision inspection devices.

It will be assumed that the lower right lens 408, FIGURE 4a, establishes the lower right image such as image 606 in the matrix 602, FIGURE 6. The corresponding lower right image of each mask will also be established by the lens 408. Each lens thus establishes a series of related images in identical locations on the respective masks.

Under the procedures of the invention, the lens 402, for example, will always optically establish the microscopic images in the upper left hand corner of the matrix of images on each and every photographic mask. Since each image that is instrumental in establishing the final configuration of a unit cell is established by a particular lens, with proper orientation being maintained during the process, the registrations of the respective images within each unit cell is thereby assured. Since the same lens is used to establish a series of related images, the effects of lens peculiarities is minimized, because such effects, if they exist, are present to an equal extent in all images of the series. Each image in a particular location will register with all other images in corresponding locations on other masks of the series, and because of such registration, the individual members produced under control of the respective masks will also register in the final product.

A typical unit cell designated 701 in FIGURE 7, has accurately registered members, with geometric configurations that correspond to those found on the master patterns of FIGURE 5. The cell 701 comprises a collector member 702 with a concentric terminal 703, an emitter element 704 with associated concentric terminal 705, and a base member 706 with an associated concentric terminal 707.

Because of the high accuracy of registration maintained by the present invention, each unit cell among the hundreds or thousands produced from a single starting wafer will have accuracy of registration that is comparable to that depicted in FIGURE 7.

The apparatus of FIGURE 1 can also be used to derive the well known metal masks rather than photographic masks. For this purpose, a direct positive and a reverse positive are required. The direct positive is first made as usual from a master pattern. The reverse positive is made in two steps. A direct negative is made from another master pattern that is the inverse of the first pattern. An emulsion to emulsion contact print is then made from the direct negative to form a reverse positive. This enables the production of metal masks etched from both sides for use where desired in a particular application. At certain times, the fabrication process is simplified if a metal mask is used for direct evaporation onto the circuit assembly, rather than selective etching of the assembly after it has been coated with metal over its entire surface.

*Production of circuit elements*

Figure 8:
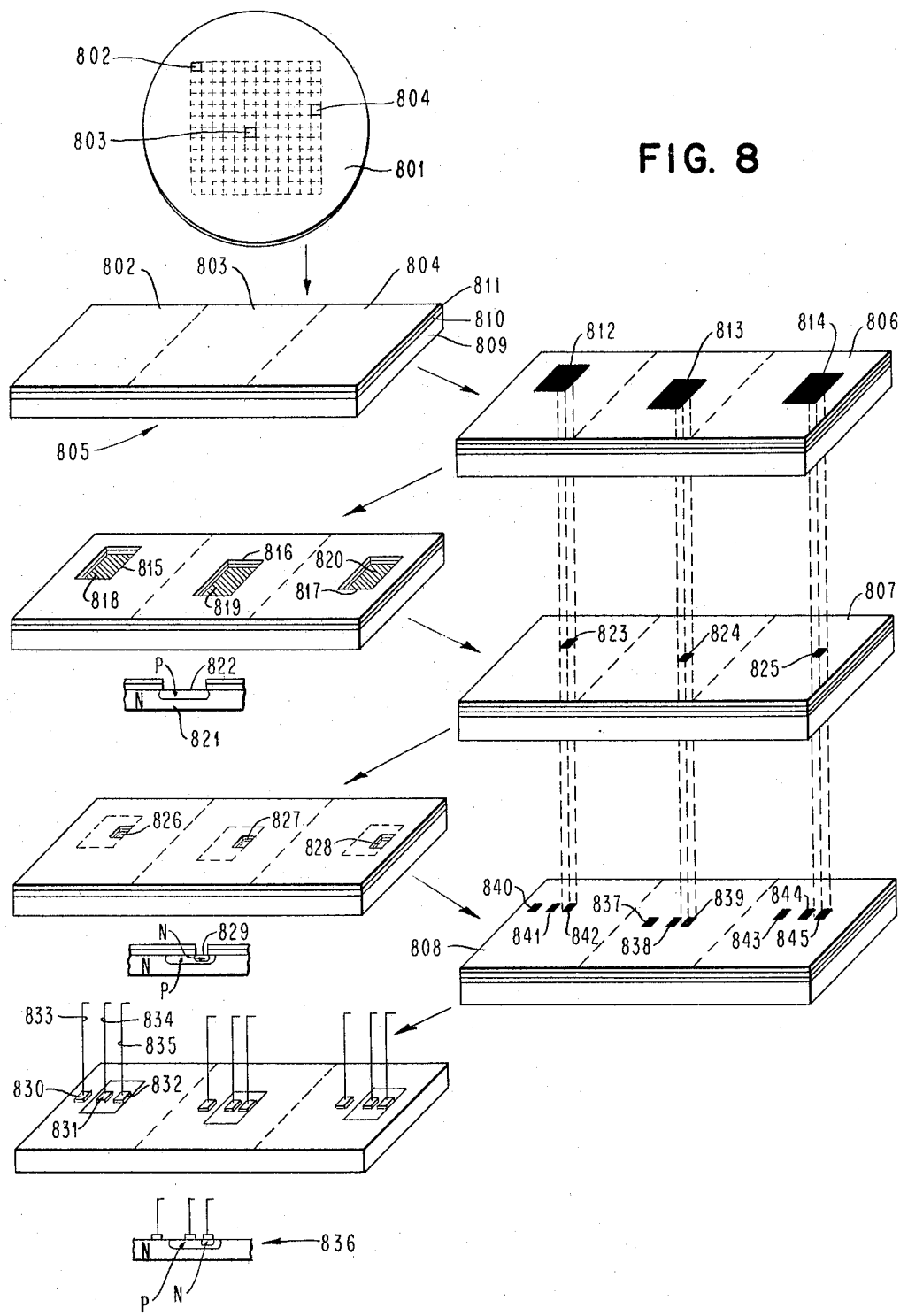
FIGURE 8 represents the use of the invention in a manufacturing process.

The great accuracy of registration gained by the present invention is further emphasized in FIGURE 8. FIGURE 8 represents various steps, though not all steps, that may be encountered during the production of a matrix microscopic semiconductor devices from a single wafer 801.

It will be understood that the invention is not limited to the specific sequence of steps discussed, but that it may be used in manufacturing processes that include a wide variety of steps and processing sequences.

For discussion purposes, it will be assumed that the wafer 801 undergoes the series of steps illustrated in order that the various members of the circuit element or device in each unit cell can be formed. In order to simplify the explanation and also to demonstrate the advantages of the invention, three unit cells 802, 803 and 804 has been selected at random on the wafer 801 and have been joined together to form a composite three-cell block designated 805. It will be understood that the cells in question have been so chosen and separated for explanatory purposes only and that generally the matrix of cells on the wafer 801 remain together during the process of fabrication. They are usually separated into individual units at or near the last stage of fabrication. It will be assumed that a series of three masks 806, 807 and 808 have previously been prepared with the apparatus of FIGURE 1. It will be seen that the masks 806, 807 and 808 have relatively simple square and rectangular configurations, when contrasted with the series of configurations shown in FIGURE 5. It is assumed that the first mask 806 establishes the configuration of the base in each unit cell, while the mask 807 establishes the configuration of the emitter in each unit cell and the mask 808 establishes terminal patterns in each unit cell.

During the first part of the process, the composite substrate 809, which is an N type material such as silicon for example, is oxidized to establish a coating 810 of silicon dioxide. A layer of photoresist 811 is then placed on the silicon dioxide 810.

A pattern for etching purposes is then established by placing the mask 806 adjacent the wafer and exposing the photoresist from an ultraviolet source. Unexposed areas will exist under each of the opaque images 812, 813 and 814. The photo-resist is then developed. The exposed areas of the resist are insoluble in the developing fluid and remain on the silicon dioxide, while the unexposed areas are dissolved. This results in the exposure of correspondingly sized areas in each of the unit cells as shown at 815, 816 and 817. The silicon dioxide layer in these areas is etched away by hydrofluoric acid, for example. This results in the exposure of the base silicon material at 818, 819 and 820.

The wafer assembly then undergoes diffusion procedures so that the silicon substrate in each unit cell as shown at 821 has formed therein a base area 822 which is a P type material, such as boron. During the diffusion process, silicon dioxide again forms and the assembly is again coated with photoresist. Subsequently, the mask 807 is accurately positioned adjacent the wafer in order to expose this coating of resist in desired areas. The mask 807 has small images 823, 824 and 825 which leave correspondingly small areas in the resist unexposed. The photoresist is developed, and the assembly etched as before in order to establish openings 826, 827 and 828 down to the silicon substrate. Diffusion again takes place in order to form the emitter in each unit cell which is an N type material, such as phosphorus, that is indicated at 829.

Silicon dioxide again forms during the diffusion pro-
Silicon dioxide again forms during the diffusion process and after being coated with another layer of photoresist, the assembly is again accurately positioned with respect to a mask 808 in order to set up resist patterns for terminal connections, for example. After exposure of the resist and its development, the exposed areas are metallized as at 830, 831 and 832 and leads attached, such as leads 833, 834 and 835. A cross-section of a typical unit cell at this time is indicated at 836.

For purposes of illustration, it was assumed that the images for controlling the formation of cell 803 are fairly centrally located within the confines of this cell location on the respective masks 806, 807 and 808. Because of this, the images 813, 824, 837, 838 and 839 will have perfect registration with one another since they were derived through the same lens in the lens array of the apparatus in FIGURE 1.

It is further assumed that the set of related images 812, 823, 840, 841 and 842 that are used in the formation of unit cell 802 are displaced slightly toward the upper left hand corner of the corresponding unit cell location in the respective masks 806, 807 and 808 because of the optical location and characteristics of the lenses through which these images were established. However, it will be noted that the images in the respective masks are displaced a corresponding amount so that, again, perfect registration is maintained among the various images, and a perfectly satisfactory circuit element is produced in this unit cell location.

As further illustration of the registration advantage, the related images 814, 825, 843, 844 and 845 in the rightmost cell locations of the masks 806, 807 and 808 are assumed to be displaced to the right of center within the cell, because of the characteristics of the lens which established these images.

Even though the images in this set which control the formation of elements in the unit cell 804 are displaced, they are all displaced a corresponding amount, since the same lens was used during the exposure of this particular area on each mask. A perfectly formed circuit element with accurately registered members like those in the other cells, is thereby obtained in cell location 804.

*Direct exposure of circuit assembly*

If desired, the steps involving the production of photographic masks such as the mask 601, FIGURE 6, can be omitted, and the apparatus of FIGURE 1 can be directly used at selected steps during the fabrication of circuit elements. Master patterns or objects such as those in FIGURE 5 are still positioned above the light box 102 in FIGURE 1. However, instead of a photographic film or glass plate, an array of circuit elements or circuit assembly is positioned on the surface 118 of platform 109 for direct exposure of each photoresist coating at various times during the operation.

Multiple images are still projected from the master pattern such as pattern 210 in FIGURE 2, but in this case the element 218 represents a properly treated substrate, while the layer 219 represents the coating of photoresist. Since the photoresist is ultraviolet sensitive, the lamps 202–205 would ordinarily represent an ultra-violet source.

Figure 9:
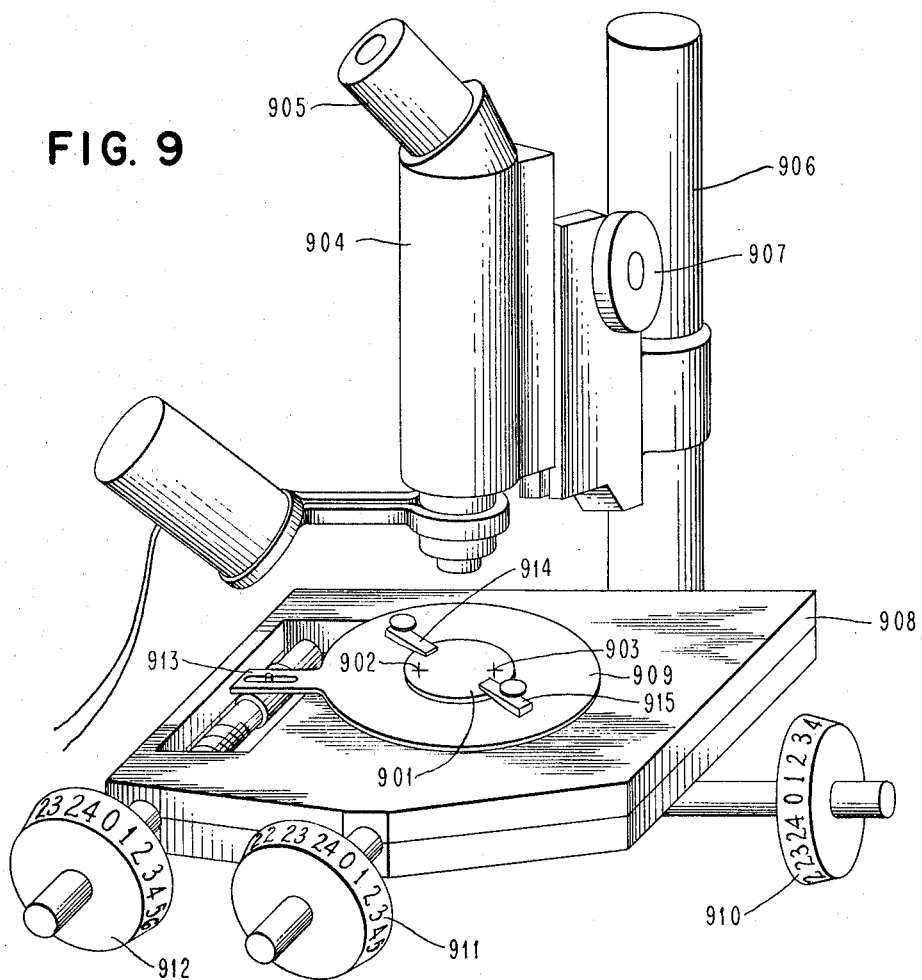
FIGURE 9 represents apparatus that may be used in conjunction with the apparatus of FIGURE 1 for alignment purposes.
Figure 10A:
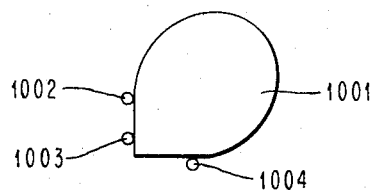
FIGURES 10a and 10b represent alternative alignment techniques for use in conjunction with the apparatus of FIGURE 1.
Figure 10B:
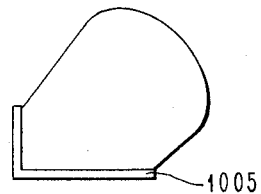

Although masks are eliminated in the direct exposure method, the orientation procedures followed before are still required, and in addition, it is desirable to provide a device such as that in FIGURE 9 for use in conjunction with the apparatus of FIGURE 1 in order to establish accurate alignment of a circuit assembly, such as the wafer 901, prior to each exposure. The wafer 901 has etched marks 902 and 903 which are inspected for alignment purposes. The device of FIGURE 9 generally comprises a microscope unit 904 with an eye piece 905. The units 904 and 905 are vertically adjustable on a column 906 by means of a knob 907. For convenience, the device of FIGURE 9 could be mounted on the column 108 in FIGURE 1 and means provided for moving it in or out of position as required. The alignment apparatus of FIGURE 9 has a stage 908 with a circular shaped platform 909 that corresponds to the platform 109 in FIGURE 1. The platform 909 is mounted for rotation in a horizontal plane. The stage 908 is supplied with three micrometer drums 910, 911 and 912 which permit its adjustment in two horizontal directions, and rotation of the platform 909 by means of a lever 913. Typically, the stage can be moved with an accuracy of 1/10,000 of an inch. The circuit assembly 901 is retained on the platform 909 by clamps 914 and 915. By manipulation of the drums 910, 911 and 912 and by visual inspection of the etched marks 902 and 903 through the instrument 904, accurate alignment of the assembly 901 can be obtained each time it is positioned for exposure. The clamps 914 and 915 can be tightened to retain the assembly 901 firmly in position, once alignment has been achieved.

Many techniques can be used for aligning the circuit assembly prior to each exposure. As another example, the assembly or substrate can be formed with a squared edge such as the substrate 1001, FIGURE 10a, and aligned against pins 1002–1004. A guide rail 1005, FIGURE 10b, can also be used.

Circuit elements formed by the direct exposure technique just described will have members as accurately registered as those produced during the first technique described, which involved the use of photographic masks.

FIGURE 8 conveniently applies to either the mask method or the direct exposure method. The designations 806, 807 and 808 can be considered to apply to photographic masks used during the various steps of the first method, or they can be considered to designate the image planes that are established when the circuit assembly is placed in the apparatus of FIGURE 1 and directly exposed to a master pattern at various times during the second method.

It is apparent that the apparatus of the present invention can be used in a wide variety of applications, such as the fabrication of silk screen patterns or the creation of arrays of holes, designs, etc., in any photosensitive medium. The practicality and advantages of the invention are further evidenced by the fact that a multiplicity of accurately defined images is established from a master image with required reduction in size in what is essentially a one step operation. This contrasts with prior art techniques which require numerous steps for their performance, and which even then do not guarantee the degree of accuracy attained by the present invention.

It is apparent that novel apparatus and methods have been developed which speed up the production of masks and development of circuit elements while maintaining high standards of accuracy and quality during the course of manufacture.

While the invention has been particularly shown and described with reference to preferred embodiments, it will be understood by those skilled in the art that various changes in form and detail may be made therein without departing from the spirit and scope of the invention.

What is claimed is:

1. A method for producing a circuit assembly having a plurality of circuit elements formed therein in a number of discrete locations, with each said element comprising a number of accurately registered members comprising the steps of:

providing an array of individual lenses of the same orientation and focal distance in a first location;

coating said assembly with a photosensitive substance and positioning said assembly in contact with said array;

projecting a master pattern of a first circuit member through said lens array for an interval of time and from a predetermined location to expose said coating and to establish a set of images therein like said first circuit member;

developing said coating to establish an apertured layer on said circuit assembly for controlling a subsequent first sequence of fabrication steps;

maintaining said lens array in said first location;

recoating said assembly a second time with a photosensitive substance upon completion of said first sequence of fabrication steps and positioning said assembly adjacent said array;

projecting a master pattern of a second circuit member through said lens array for an interval of time and from said predetermined location to expose said second coating and to establish therein a set of images like said second circuit member;

and developing said second coating to establish an apertured layer on said circuit assembly for controlling a subsequent second sequence of fabrication steps.

2. A method for producing a circuit assembly having a plurality of microscopic circuit elements formed therein in a number of discrete locations, with each said element comprising a number of accurately registered members comprising the steps of:

providing an array of individual microscopic lenses of the same orientation and focal distance in a first location;

coating said assembly with a photosensitive substance and positioning said assembly in contact with said array;

projecting a master pattern of a first circuit member through said lens array for an interval of time and from a predetermined location to expose said coating and to establish a set of images therein like said first circuit member, but which correspond in size to the circuit member to be produced;

developing said coating to establish an apertured layer on said circuit assembly for controlling a subsequent first sequence of fabrication steps;

maintaining said lens array in said first location; recoating said assembly a second time with a photosensitive substance upon completion of said first sequence of fabrication steps and positioning said assembly in contact with said array; projecting a master pattern of a second circuit member through said lens array for an interval of time and from said predetermined location to expose said second coating and to establish therein a set of images like said second circuit member, but which correspond in size to the circuit member to be produced;

and developing said second coating to establish an apertured layer on said circuit assembly for controlling a subsequent second sequence of fabrications.

3. A process for generating multiple image masks comprising the steps of:
  (a) preparing a master pattern at a relatively large scale for photo reduction to a relatively small scale;
  (b) positioning the master pattern with relation to a light emitting source which generates light rays;
  (c) positioning a photosensitive medium in the light ray field;
  (d) pressing the photosensitive medium against a transparent member spaced from the master pattern, the transparent member having a plurality of optical lenses of relatively short focal distance with respect to the pattern distance and of the same orientation with respect to each other;
  (e) projecting said master pattern through the transparent member to the photosensitive medium to expose said medium in a plurality of discrete areas corresponding to the number of optical lenses thereby to establish at each of the respective areas an image corresponding to the master pattern;
  (f) and preparing a permanent mask of multiple images from said photosensitive medium for use in fabricating circuit components.

4. A process for generating a series of accurately registerable, multiple image masks comprising the steps of:
  (a) indexing a master pattern with relation to a light emitting source which generates light rays, the master pattern being at a relatively large scale for photo reduction to a relatively small scale;
  (b) indexing a photosensitive medum in the light ray field;
  (c) pressing the photosensitive medium against a simple lens spaced from the master pattern, the simple lens having a plurality of convex-plano lenses of the same orientation and whereby the focal distance is relatively short with respect to the pattern distance;
  (d) projecting the master pattern through the simple lens to expose the photosensitive medium in a plurality of discrete areas corresponding to the number of convex-plano lenses that are uncovered thereby to establish at the respective areas a reduced image corresponding to the master pattern;
  (e) and preparing a permanent mask of multiple images from said photosensitive medium for use in fabricating circuit components, said mask including a plurality of blank marks corresponding to the number of covered lenses, said blank marks serving as registration means among successive masks in fabricating circuit components, covering preselected lenses.

5. A process for generating a series of accurately registerable, multiple image masks comprising the steps of:
  (a) positioning a master pattern with relation to a light emitting source which generates light rays;
  (b) positioning a photosensitive medium in the light ray field;
  (c) pressing the photosensitive medium against a transparent member spaced from the master pattern, the transparent member having an array of optical lenses of relatively short focal distance with respect to the pattern distance and of the same orientation, the fixed focal distance being common to all lenses, the transparent member having vacancies in the lens array at predetermined locations;
  (d) projecting said master pattern through the transparent member to the photosensitive medium whereby each lens focuses light on the photosensitive medium at a discrete area to expose the medium thereby to establish at the respective areas an image corresponding to the master pattern;
  (e) preparing a permanent mask of multiple images from said photosensitive medium for use in fabricating circuit components, said mask having vacancies in the pattern as a result of the lens vacancies, and employing the pattern vacancies for mask registration purposes among the series of masks.

6. Apparatus for producing articles having arrays of similar patterns comprising:
  (a) projection means including a light emitting source and means for indexing a pattern with relation to the light source;
  (b) a simple lens of a material to transmit a portion of the ultraviolet spectrum as well as the complete visible spectrum, thereby to permit a photographic medium to respond to light anywhere in the visible and ultraviolet spectrum, said simple lens having an array of convex-plano lenses, the simple lens being positioned in a plane parallel to the projection means;
  (c) means for providing the lens with a fixed focal distance;
  (d) means for providing the lens with a variable object distance, the fixed focal distance being relatively small with respect to all possible object distances;
  (e) and means for holding and indexing a photosensitive surface in contact with the simple lens whereby placing a pattern on the projecting means and projecting the pattern through the simple lens to the photosensitive surface exposes the surface at a plurality of discrete areas corresponding to the number of convex-plano lenses in the array thereby to establish at the respective areas an image corresponding to the pattern.

7. Apparatus for producing articles having arrays of similar patterns comprising:
  (a) projection means including a light emitting source;
  (b) a transparent member having an array of lenses, the transparent member being positioned in a plane parallel to the projection means whereby each optical lens has a substantially identical object distance with relation to the projection means, each lens further having a substantially identical focal distance which terminates on a back surface of the transparent member, the focal distance being relatively small with relation to the object distance, an aperture plate positioned between the projection means and transparent member, said aperture plate limiting the light to some lenses and preventing the light from passing through other lenses;
  (c) and a photosensitive surface in contact with the back surface of the transparent member whereby placing a pattern on the projection means and projecting the pattern through the lens to the photosensitive surface exposes the surface at a plurality of discrete areas corresponding to the number of optical lenses uncovered by the aperture plate thereby to establish at the respective areas an image corresponding to the pattern the photosensitive surface being unexposed in other areas due to the aperture plate preventing the light from passing through the other lenses, the unexposed areas in the photosensitive surface serving as a registration means.

8. Apparatus for producing articles having arrays of similar patterns comprising:
  (a) projection means including a light emitting source and means for indexing a pattern with relation to the light source;
  (b) a transparent member having an array of optical lenses of the same orientation, the array having optical lenses omitted, at preselected positions, the transparent member being positioned in a plane parallel to the projection means to establish an object distance for each lens with relation to the projection means, each lens further having a focal distance which terminates at a back surface of the transparent member, the focal distance being relatively short with relation to the object distance;
  and means for holding and indexing a photosensitive surface firmly in contact with the back surface of the transparent member whereby placing and indexing a sequence of patterns on the projection means and successively projecting each pattern through the lens to a distinct photosensitive surface exposes each surface at a plurality of discrete areas corresponding to the number of lenses thereby to establish at the respective areas an image corresponding to the pattern placed on the projection means, each pattern suitable, thereafter, for conversion into distinct masks which are accurately registerable with one another by means of blank marks in the pattern as a result of the omitted lenses for producing articles having arrays of similar patterns.

9. A method of fabricating a circuit element comprising the steps of:
  (a) preparing a master pattern having opaque and transparent areas arranged in a preselected geometric configuration for an electrode structure associated with a circuit element, the master pattern further having indexing means for registration purposes;
  (b) indexing the master pattern with relation to a light emitting source which generates light rays;
  (c) applying an insulating adherent film to a circuit member;
  (d) coating the film coated circuit member with a photosensitive medium;
  (e) indexing the photosensitively covered circuit element in the light ray field;
  (f) pressing the photosensitively covered circuit element against a transparent member having a plurality of optical lenses;
  (g) projecting the master pattern through a transparent member to expose said photosensitively covered circuit element in a plurality of discrete areas corresponding to the number of optical lenses thereby to establish exposed and unexposed areas in the respective image areas corresponding to the master pattern;
  (h) and developing the exposed circuit member to dissolve the unexposed areas in each image area for a subsequent sequence of fabrication steps for the circuit element.

10. A process for fabricating circuit components comprising the steps of:
  (a) positioning a master pattern with relation to a light emitting source which generates light rays, the pattern having opaque and transparent areas arranged in a preselected geometric configuration;
  (b) positioning a photosensitive medium in the light ray field;
  (c) projecting said master pattern through a transparent member to the photosensitive medium, the transparent member having a plurality of optical lenses to expose said photosensitive medium in a plurality of discrete areas corresponding to the number of optical lenses thereby to establish at the respective areas an image corresponding to the master pattern;
  (d) converting said exposed photosensitive medium to a mask having a plurality of photographically identical microscopic images including opaque and transparent areas which are exact replicas of the geometric configuration in the master pattern;
  (e) applying an insulating adherent film to an element;
  (f) coating the element with a photosensitive medium;
  (g) registering the mask and the photosensitively coated element;
  (h) exposing the masked element to a light source to establish exposed and unexposed areas at each image area in the mask;
  (i) and developing the element to expose film areas at each image area for controlling a subsequent sequence of steps for fabricating a circuit component.

11. A process for fabricating circuit components comprising the steps of:
  (a) positioning a master pattern with relation to a light emitting source which generates light rays, the pattern having opaque and transparent areas arranged in a preselected geometric configuration;
  (b) positioning a photosensitive medium in the light ray field;
  (c) pressing the photosensitively covered medium against a transparent member spaced from the pattern, the member having a plurality of optical lenses of a common fixed focal distance and the same orientation, the focal distance being relatively short with respect to the pattern distance;
  (d) projecting the master pattern through the transparent member to expose the photosensitive medium in a plurality of discrete areas corresponding to the number of optical lenses thereby to establish at the respective areas an image corresponding to the master pattern;
  (e) converting the exposed photosensitive medium to a mask having a plurality of photographically identical microscopic images which are exact replicas of the opaque and transparent areas in the geometric configuration of the master pattern;
  (f) applying an insulating adherent film layer to an element;
  (g) coating the element with the photosensitive medium;
  (h) registering the mask and the photosensitively coated element;
  (i) exposing the masked element to a light source to establish exposed and unexposed areas at each image area in the mask, the exposed and unexposed areas at each image area corresponding to the transparent and opaque areas, respectively, in the pattern;
  (j) and developing the element to expose film areas at each image area for controlling a subsequent sequence of steps for fabricating a circuit component.

12. A process for fabricating circuit components comprising the steps of:
  (a) indexing a master pattern with relation to a light emitting source which generates light rays, the pattern having opaque and transparent areas arranged in a preselected geometric configuration;
  (b) indexing a photosensitive medium in the light ray field;
  (c) pressing the photosensitive medium against a transparent member spaced from the master pattern, the member having an array of optical lenses of relatively short focal distance with respect to the pattern distance and of the same orientation, the member further having lens vacancies at predetermined locations;
  (d) projecting said master pattern through the transparent member to the photosensitive medium to expose the medium at a plurality of discrete areas corresponding to the number of lenses thereby to establish at the respective areas an image corresponding to the master pattern;

(e) converting said exposed photosensitive medium to a mask having an array of photographically identical microscopic images with vacancies therein as a result of the vacancies in the lens array, each image being an exact replica of the opaque and transparent areas in the geometric configuration of the master pattern;

(f) applying an insulating adherent film layer to an element;

(g) coating the element with a photosensitive medium, (h) registering the mask and the coated element by employing the vacancies in the mask pattern;

(i) exposing the masked element to a light source to establish exposed and unexposed areas at each image area in the mask, the exposed and unexposed areas at each image area corresponding to the transparent and opaque areas, respectively, in the pattern;

(j) and developing the element to expose film areas at each image area for controlling a subsequent sequence of steps for fabricating a circuit component.

13. A process for fabricating circuit components comprising the steps of:

(a) preparing a first master pattern having indexing means;

(b) preparing a second master pattern having indexing means identical to that of the first master pattern;

(c) indexing the first master pattern with relation to a light emitting source which generates light rays;

(d) indexing a first photosensitive medium in the light ray field;

(e) projecting the first master pattern through a transparent member to the first photosensitive medium, the transparent member having an array of optical lenses of the same orientation and focal distance, each lens focusing on the first photosensitive medium at a discrete area to expose the first medium thereby to establish at the respective areas an image corresponding to the first master pattern;

(f) converting said first exposed photosensitive medium to a first mask having a plurality of photographically identical microscopic images which are replicas of the geometric configuration in the first master pattern;

(g) projecting said second master pattern through the transparent member to a second photosensitive medium to expose the medium thereby to establish at the respective areas an image corresponding to the second master pattern;

(h) converting said second exposed photosensitive medium to a second mask having a plurality of photographically identical microscopic images wihch are exact replicas of the geometric configuration in the second master pattern;

(i) applying an insulating adherent film layer to an element;

(j) coating the element with a photosensitive material;

(k) registering the first mask and the element;

(l) exposing the element covered by the first mask to a light source which establishes exposed and unexposed areas at each image area in the photosensitive material;

(m) developing the element to expose film areas at each image area for subsequently controlling a first sequence of steps for fabricating a circuit component;

(n) reapplying the insulating adherent film layer to the circuit component;

(o) recoating the circuit component with the photosensitive material;

(p) registering the second mask and the circuit component;

(q) exposing the circuit component covered by the second mask to a light source to establish exposed and unexposed areas in each image area;

(r) and developing the element to expose film areas at each image area for subsequently controlling a second sequence of steps for fabricating the circuit component.

References Cited by the Examiner

UNITED STATES PATENTS

| | | | |
|---|---|---|---|
| 373,404 | 11/1887 | Hulbert | 95—18 |
| 1,793,698 | 2/1931 | Jones | 88—24 |
| 2,061,729 | 11/1936 | Draper | 88—24 |
| 2,064,145 | 12/1936 | Bonneau | 88—24 |
| 2,174,003 | 9/1939 | Ives | 95—18 |
| 2,207,236 | 7/1940 | Uden | 88—24 |
| 2,724,312 | 11/1955 | Gruetzner | 95—18 |
| 3,065,681 | 11/1962 | Borneniann | 95—85 X |
| 3,099,195 | 7/1963 | Goodbar | 95—18 X |

JOHN M. HORAN, *Primary Examiner.*